S. R. LEONARD.
FENCE GATE.
APPLICATION FILED JUNE 22, 1908.
963,447.
Patented July 5, 1910.
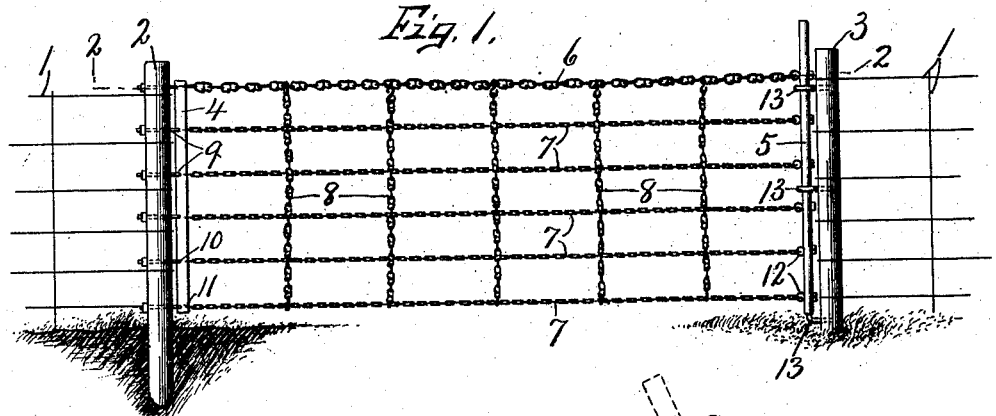
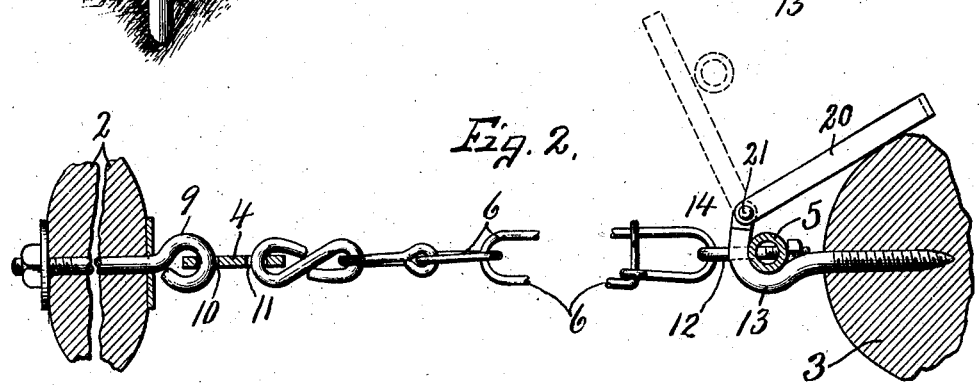
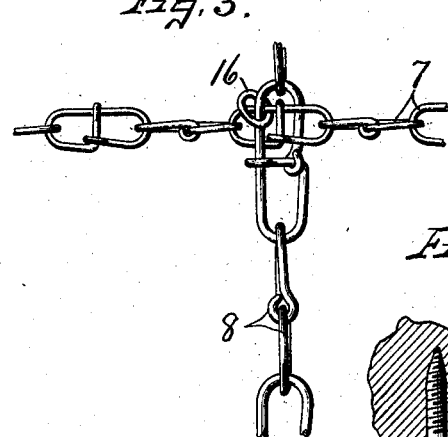
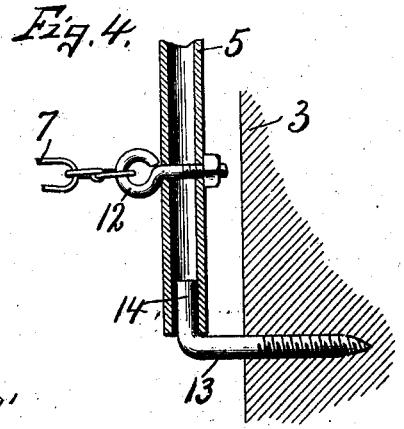
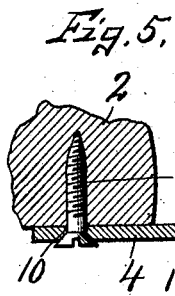
Witnesses.
A. C. Thomas
H. E. Chau
Inventor.
Stephen R. Leonard
By
Howard P. Denison
Attorney.
THE NORRIS PETERS CO., WASHINGTON, D. C.

UNITED STATES PATENT OFFICE.

STEPHEN R. LEONARD, OF ONEIDA, NEW YORK, ASSIGNOR TO ONEIDA COMMUNITY, LIMITED, OF ONEIDA, NEW YORK, A CORPORATION OF NEW YORK.

FENCE-GATE.

963,447. Specification of Letters Patent. Patented July 5, 1910.

Application filed June 22, 1908. Serial No. 439,850.

*To all whom it may concern:*

Be it known that I, STEPHEN R. LEONARD, of Oneida, in the county of Madison, in the State of New York, have invented new and useful Improvements in Fence - Gates, of which the following, taken in connection with the accompanying drawings, is a full, clear, and exact description.

This invention relates to certain improvements in fence gates and is particularly useful as a farm gate for private drive ways, at railroad cross-overs and at other places where it may be desired to provide a movable section of the fence to afford a temporary passage therethrough.

My main object is to provide a flexible gate or movable fence section composed of vertical end bars and connected by a series of chains disposed one above the other which in turn are tied together at intervals by vertical chains, the horizontal chains being threaded through certain links of the vertical chains to prevent undue sagging of the intermediate portions of said horizontal chains.

The object in constructing the gate of intersecting chains is to enable such gate as an article of manufacture to be readily made up of any length or height and rolled or folded into compact form for storage or transportation.

Another object is to provide a simple means for tying the horizontal and vertical chains at their intersections to prevent their undue relative movement.

A further object is to enable the gate to be easily and quickly attached to suitable gate posts by permanently connecting one of the upright end bars to one of the posts and providing the other post with hook-shaped anchors with which the other upright bars may be readily engaged and disengaged.

Other objects and uses will be brought out in the following description.

In the drawings—Figure 1 is an elevation of a portion of a fence showing the gate posts and my improved gate as connected thereto. Fig. 2 is an enlarged horizontal sectional view partly broken away, taken on line 2—2, Fig. 1. Fig. 3 is an enlarged elevation of the intersecting portion of one of the bars and one of the upright chains showing the manner of threading the horizontal chain through one of the links of the upright chain and also showing the tie pieces connecting said chains at the intersection to prevent their undue relative movement. Fig. 4 is a vertical sectional view of the lower end of the tubular end bar showing the anchorage for one of the horizontal chains and also showing one of the retaining hooks for the lower end of the upright bar. Fig. 5 is a modified view showing the cross section of a portion of the upright showing how the plate 4 is secured.

In order to clearly demonstrate the practicability of my invention, I have shown a portion of a wire fence —1— as provided with a suitable gate opening and upright end posts —2— and —3— determining the width of the gate opening.

My improved gate comprises essentially opposite upright end bars —4— and —5—, horizontal parallel chains —6— and —7— and vertical parallel chains —8—. The upright bar —4— is preferably made of heavy sheet metal as steel of a suitable height corresponding to the height of the fence and is permanently fastened by suitable means as bolts —9— to the upright post —2— and for this purpose is provided with a series of apertures —10— disposed equi-distant apart one above the other for receiving the fastening members —9— which may be eye bolts as shown in the drawings or the bar —4— may be permanently secured to one side of the post by ordinary screws or bolts —9'— as shown in Fig. 5, said bar —4— being provided with additional apertures —11— disposed one above the other near its opposite edge for the reception of the adjacent links of the horizontal chains —6— and 7 which are permanently fastened to the bar —4—. The apertures —11— are in this instance disposed in the same horizontal plane as alternate apertures —10— so that the tension of the horizontal chains is in direct alinement with alternate bolts —9— whereby the gate may be tightened under high tension without liability of buckling or bending the upright end bar —4—. The opposite upright end bar —5— preferably consists of a metal tube such as a pipe section of somewhat greater vertical height than the bar —4— so as to afford a convenient handle at the top thereof and is provided at regular predetermined intervals with a series of eyes or bolt anchors —12— disposed in the same plane as and connected to the end links of the horizontal chains —6— and —7— as best seen in Figs. 1, 2 and 4. This tubular upright end bar —5— is, therefore, permanently secured to the ends of the horizontal chains —6— and 7 which are of just sufficient length to bring the end bar —5— in close proximity to the inner side of the upright post —3— when the horizontal chains are drawn up tightly, said end bar —5— being detachably engaged with a series of hook-shaped anchors —13— which are provided with threaded shanks screwed into the post —3— and are located at suitable intervals one above the other to engage the inner faces of the end bar —5— between the chain anchors —12—. Each of these anchor bolts —13— is provided with a lateral offset —14— of sufficient projection to receive and retain a portion of the upright bar —5—, the offset —14— of the lower anchor bolt —13— being shown in Figs. 1 and 4 as disposed in an upright position and entering the lower end of the tubular end bar —5— and constitutes a fulcrum for the end bar —5— when drawing the gate up tight, the remaining hooks having their offsets disposed in the horizontal positions as shown in Figs. 1 and 4 leaving a sufficient space between the offset and adjacent side of the post —3— to receive the end bar —5—.

In placing the gate in operative position, the end bar —4— is attached in the manner described to the post —2— and is then stretched out toward the post —3— by means of the bar —5—, the lower end of which is brought into interlocking engagement with the lower anchor bolt or fulcrum —13— after which the operator engaging the upper end or handle of the tubular bar —5—, uses the latter as a lever for drawing the horizontal chains of the gate up tight, the bar being then brought into engagement with the offsets of the upper bolt anchors —13—, which offsets are deflected slightly toward the post —3— as best seen in Fig. 2, to retain the bar —5— in operative position and at the same time leaving an open space between the offsets and posts through which the bar —5— may be moved to disengage or detach it from its anchor bolts —13—.

When it is desired to open the gate it is simply necessary to pull the upper end of the bar laterally out of engagement with the offset portions of the upper hooks —13— and to then lift said bar out of engagement with the offset of the lower anchor bolt —13— whereupon the bar —5— with the gate chains attached thereto may be carried toward the post —2— or to one side thereof to leave a clear opening between the posts —2— and —3— when it is desired to drive or pass through said opening after which the gate may be closed in the manner previously described.

The links of the upper chain —6— are somewhat larger than those of the remaining horizontal chains —7— so as to give greater strength to the gate when closed and to support the intervening cross chains and lower horizontal chains. These cross chains —8— are suspended vertically at regular intervals from the upper horizontal chain —6— and as best seen in Fig. 3, the horizontal chains —7— are threaded through intersecting links of the vertical chains —8—, the intersecting links being tied together by suitable rings or additional links —16— also shown in Fig. 3 to prevent undue sagging of the intermediate portions of the horizontal chains and also to prevent undue movement of the intersecting chains relatively to each other. These tie links —16— surround or embrace one side of each of the intersecting links of the horizontal cross chains and while they allow a certain flexibility at the intersection of said chains to prevent kinking or knotting of the links, they serve to prevent sagging of the intermediate portions of the horizontal chains and also keep intersecting portions of both the horizontal and cross in approximately fixed relation to each other so that the entire gate may be rolled and folded and unfolded without liability of kinking or knotting.

In some instances it may be desirable to provide suitable means for tightening the gate when mounted to an operative position upon the posts, and for this purpose I have provided a lever —20— which is fulcrumed at —21— to one of the anchor bolts —13— and is adapted to be brought into engagement with the upright bar —5— to draw adjacent end of the gate toward the post —3—, when the other end is fastened to the post —2— in any suitable manner. One or more of these levers —20— may be employed as may be desired.

What I claim is:

1. The combination with gate posts, of a flexible gate having a hinged connection with one of the posts, and means carried by the other post for retaining the gate in closed position, said means comprising one or more permanently positioned hook-shaped members, each member having the axis of its hook opening in parallelism with the axis of the post, the free end of the hook being bent inward sufficiently to prevent disengagement of hook and gate under the action of the weight of the intermediate portion of the gate, but insufficient to prevent such disengagement when the gate is rendered taut, and means carried by the free end of a hook member for inserting the gate within the member, said means having an extended riding face for the gate, said face being substantially free from depression, and a separate device carried by said latter post for retaining the gate in fixed position when closed.

2. The combination with gate posts, of a flexible gate having a hinged connection with one of the posts, and means carried by the other post for retaining the gate in closed position, said means comprising one or more permanently positioned hook-shaped members, each member having the axis of its hook opening in parallelism with the axis of the post, the free end of the hook being bent inward sufficiently to prevent disengagement of hook and gate under the action of the weight of the intermediate portion of the gate, but insufficient to prevent such disengagement when the gate is rendered taut, a separate device carried by said latter post for retaining the gate in fixed position when closed, and means carried by the free end of a hook member for inserting the gate within the member.

3. The combination with gate posts, of a flexible gate having a hinged connection with one of the posts, and means carried by the other post for retaining the gate in closed position, said means comprising one or more permanently positioned hook-shaped members, each member having the axis of its hook opening in parallelism with the axis of the post, the free end of the hook being bent inward sufficiently to prevent disengagement of hook and gate under the action of the weight of the intermediate portion of the gate, but insufficient to prevent such disengagement when the gate is rendered taut, a separate device carried by said latter post for retaining the gate in fixed position when closed, and means carried by the free end of a hook member for inserting the gate within the member, said means being normally out of contact with the gate.

In witness whereof I have hereunto set my hand this 6th day of June 1908.

STEPHEN R. LEONARD.

Witnesses:
H. E. CHASE,
HOWARD P. DENISON.